United States Patent [19]

Councilman

[11] Patent Number: 4,548,367

[45] Date of Patent: Oct. 22, 1985

[54] BAIT CLICKER FOR FISHING REEL

[75] Inventor: Richard R. Councilman, Collinsville, Okla.

[73] Assignee: Brunswick Corporation, Skokie, Ill.

[21] Appl. No.: 539,312

[22] Filed: Oct. 5, 1983

[51] Int. Cl.[4] .............................. A01K 89/01
[52] U.S. Cl. .................. 242/84.51 R; 242/84.2 R
[58] Field of Search .............. 242/84.51 R, 84.51 A, 242/84.2 R, 84.2 A, 211, 212, 213, 214; 116/67 R, 155

[56] References Cited

U.S. PATENT DOCUMENTS

| | | | |
|---|---|---|---|
| 841,891 | 1/1907 | Pepper | 242/84.1 J X |
| 2,176,247 | 10/1939 | Coxe | 242/84.51 R |
| 2,399,863 | 5/1946 | Forestiere, Sr. | 242/84.51 R |
| 3,020,665 | 2/1962 | Hull | 242/84.51 A |
| 3,039,716 | 6/1962 | Visockis | 242/84.2 B |
| 3,241,788 | 3/1966 | Visockis | 242/84.51 R |
| 3,630,166 | 12/1971 | Riddle | 242/84.51 R X |
| 4,087,058 | 5/1978 | Yamasaki et al. | 242/84.51 R |
| 4,201,355 | 5/1980 | Ruin | 242/84.1 R |
| 4,376,518 | 3/1983 | Gifford et al. | 242/84.2 R |

Primary Examiner—Stuart S. Levy
Assistant Examiner—Katherine Jaekel
Attorney, Agent, or Firm—Wood, Dalton, Phillips, Mason & Rowe

[57] ABSTRACT

A bait clicker that can be simply slip-fit into a bore in the reel housing. The clicker consists of an external control knob formed integrally with an elongate bifurcated body which secures the clicker with the housing. The legs are deformed by the housing as they are introduced through the bore. With the clicker in assembled relationship with the housing, the housing is closely captured between the control knob and a lip formed integrally at the free end of one of the legs, which lip seats behind the inside wall of the housing once the lip is fully through the bore. From the other leg extends an integrally formed, resilient elongate finger which engages with the teeth of one of the gears either on the centershaft or on the crankshaft to produce an audible clicking sound upon rotation thereof in either direction. The finger is angularly inclined from the axis of the bore so that upon rotation of the clicker, the finger can be moved selectively either in or out of engagement with the gear.

13 Claims, 10 Drawing Figures

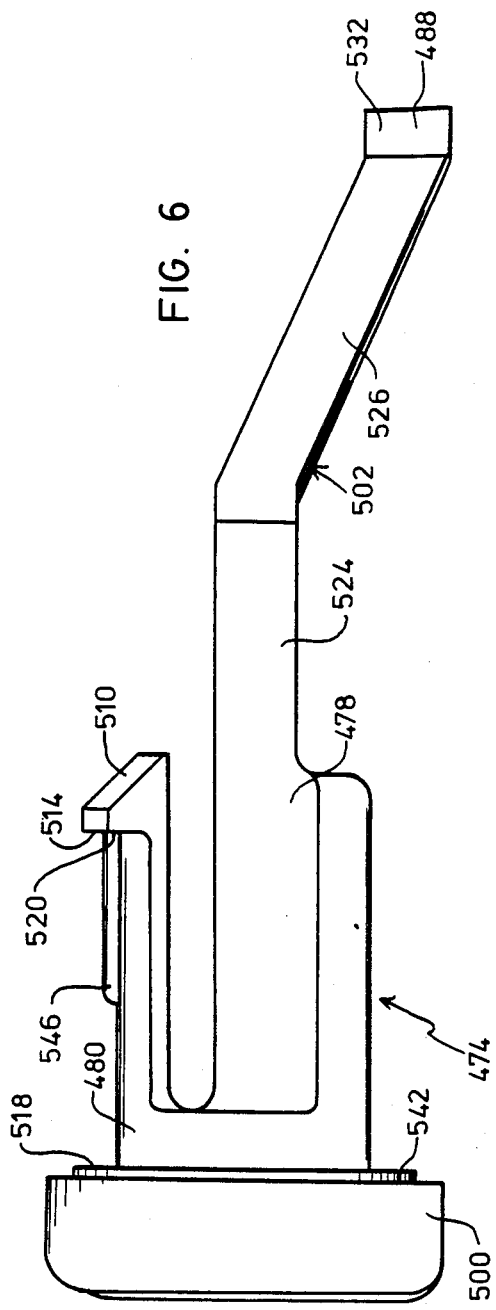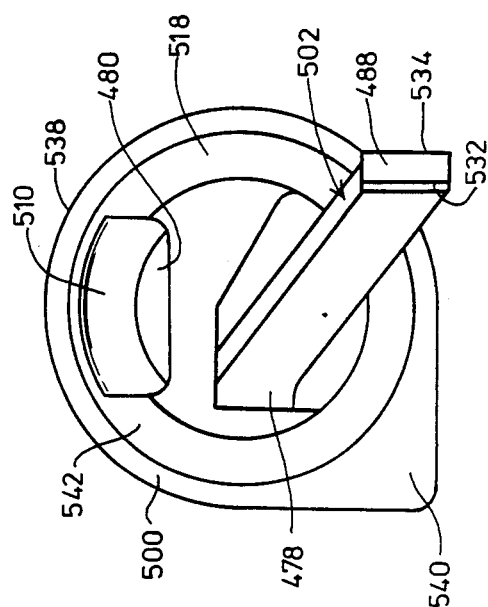

BAIT CLICKER FOR FISHING REEL

DESCRIPTION

1. Technical Field

The invention relates to fishing reels and, more particularly, relates to a bait clicker that can be press-fit into a bore through the reel housing.

2. Background of the Invention

Bait clickers are used in fishing reels to alert the operator that line is being removed from or retrieved upon a rotatable line carrying spool. Given the potentially smooth and silent operation of conventional reels, the withdrawal of line from a reel by a fish or as a result of a snag may go undetected by the operator. To prevent this from occurring, an arrangement of elements is incorporated into the reel which causes a member to interact with a part of the reel that moves in response to rotation of a portion of the reel, such as the pinion gear on the crankshaft, and produces an audible signal.

Exemplary of such a structure is that shown in U.S. Pat. No. 3,020,655 to Hull. In Hull a flat lever member is pivotally secured with the deck plate and has at one end a flexible spring finger. The lever is manipulable about the pivot to selectively either engage the finger with a gear on the centershaft or separate the gear and finger for silent reel operation. At the lever end opposite where the finger is mounted, a crank slot is provided for reception of a crank pin. The pin is carried on a pivotable circular crank which is manipulable through a portion protruding externally of the reel housing.

The Hull structure associated with the bait clicker is intricate and involves the cooperative engagement of numerous parts. The lever and crank must be separately and pivotally secured with the deck plate. Thus numerous assembly steps are required. With increased assembly time comes a proportionate increase in manufacturing costs. Further, the large number of interacting elements employed in Hull increases substantially the possibility of malfunction.

The present invention is directed to overcoming the above enumerated problems.

SUMMARY OF INVENTION

The present invention comprises a bait clicker which is functional with all types of fishing reels in producing an audible signal such as a clicking sound to alert the user that a gear on either a crankshaft or centershaft is rotating to either withdraw line from or to retrieve line upon a spool. In its simplest form, the bait clicker comprises an externally actuable control knob, an integrally formed body portion through which the bait clicker and reel housing are mated and a resilient finger integrally formed with the body portion and engageable with a toothed element that rotates in response to rotation of the crankshaft or centershaft.

It is the principal object of the present invention to provide a bait clicker that is simple in design, inexpensive to manufacture and easy to assemble, yet which is dependable and effective in operation.

To achieve this end, the bait clicker is designed so that it can be readily molded in one piece from lightweight plastic or other resilient material. The clicker is assembled with the reel housing by a simple slip-fit operation. In a preferred form, the body portion is bifurcated to define spaced, elongate legs. The legs cooperatively occupy a space with a diameter substantially equal to a receptive bore through the reel housing. The clicker is introduced to the bore with the lip on the one leg deforming the legs each toward the other through the restrictive bore. With the clicker in a fully seated position, the wall of the housing is captured closely between the control knob and the lip, with the latter being biased behind the wall of the housing by the restoring forces in the one leg. Thus assembly of the bait clicker entails merely introducing the clicker at the bore and forcing the clicker through the bore in a single motion to the fully assembled position. The control knob can be set in one of at least two positions with one position holding the clicker out of contact with the gear for silent operation and with a second position holding the clicker in contact with the gear for generating the audible sound.

The finger is formed integrally with one of the legs. In a preferred form, the free end of the finger engages a toothed member associated with a crankshaft or centershaft. Where a pinion gear is disposed on a centershaft in meshed relationship with a face gear on a crankshaft, it is contemplated that the clicker be introduced at the opposite side of the reel housing than that from which the crankshaft protrudes and that the finger act upon the pinion gear. As the centershaft rotates, the finger is flexed consecutively by each tooth and is caused by the restoring force in the finger to be propelled against the adjacent, following tooth to produce the clicking sound.

The finger, coacting either with the pinion gear or with the main crank gear, is constructed with an angled portion which presents the free end at the gear in substantially radial alignment with the rotational axis of the gear. Rotation of the crankshaft in either direction is thus permitted and will produce the audible sound.

BRIEF DESCRIPTION OF DRAWINGS

FIG. 6 is an enlarged side elevation view of the bait clicker;

FIG. 7 is an enlarged end view of the bait clicker;

DESCRIPTION OF THE BASIC STRUCTURE AND OPERATION OF THE FISHING REEL

Figure 1:
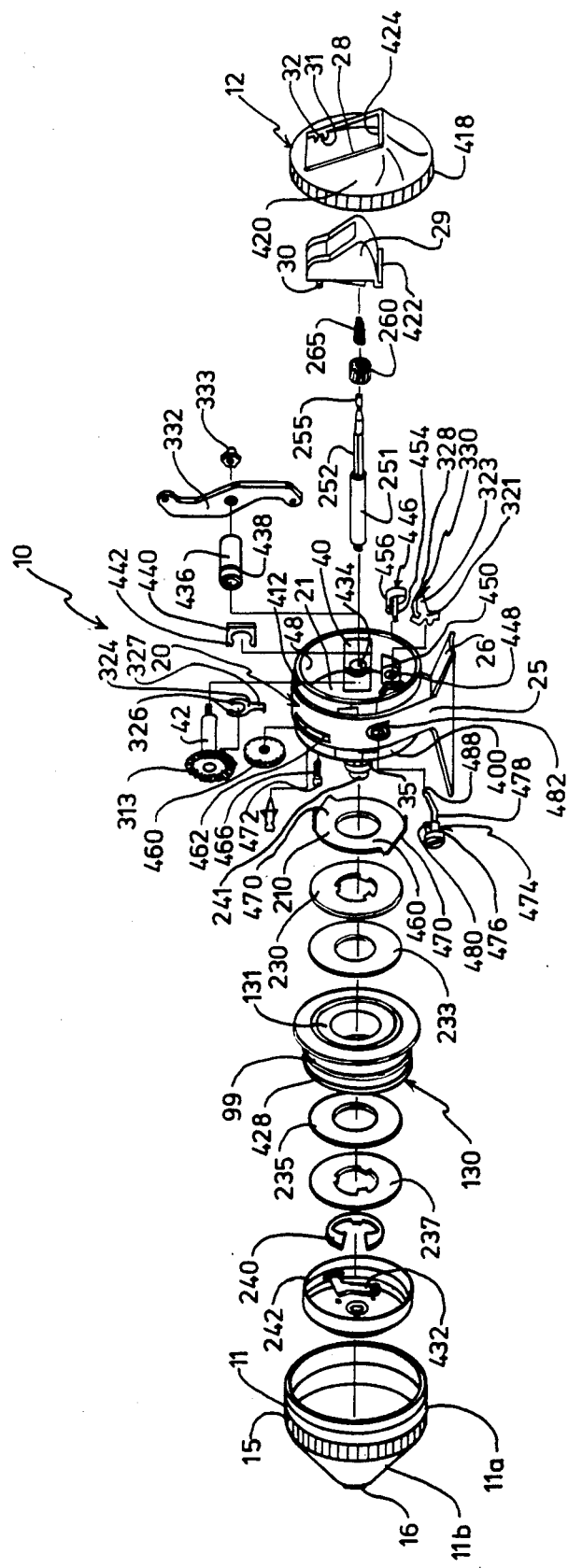
FIG. 1 is an exploded view of a reel embodying the invention.
Figure 2:
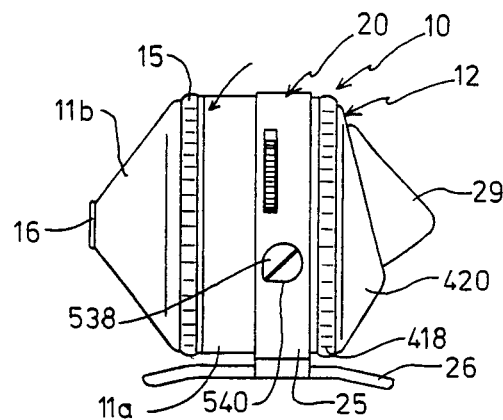
FIG. 2 is a left side elevation view of the assembled reel of FIG. 1.

Referring initially to FIG. 1, there is shown a reel 10 including a closed face housing having a reel body 20 to which is attached a front cup-shaped cover 11 and a rear cup-shaped cover 12. The front cover 11 has a cylindrically shaped first part 11a closely surrounding a forwardly opening annular rim 400 on the reel body 20. The front cover tapers radially forwardly from the cylindrical first part 11a to define a cone-shaped second part 11b. A circular line opening is provided in the conical second part 11b and mounts an annular line guide 16 in a conventional manner.

The front cover 11 is removably attached with the reel body 20 in a conventional manner. To facilitate grasping and rotation of the front cover 11 during assembly, a knurled gripping portion 15 is defined on the external surface of the cover 11. The rear cover 12 is removably attachable in a conventional manner with a rearwardly opening rim 412 associated with the back of the reel body 20. A knurled portion 418 is provided on the external surface of the cover 12 to facilitate assembly.

The rear cover 12 has a sloped wall 420 defining a rectangular opening 28 for reception of a one-piece thumb button 29. The thumb button has a shape substantially mating with the shape of the opening 28 in the rear cover 12 and has a pair of sidewardly extending pivots 30 on the upper forward side edges thereof which engage in pivot openings 31 formed in the adjacent side walls 32 of the opening 28. A lip 422 extends laterally along the bottom edge of the thumb button 29. With the thumb button assembled from the inside of the cover 12, the pivots 30 are introduced to the slotted openings 31 in the walls 32 of the rear cover. The lip 422 abuts the edge 424 of the wall defining the bottom of the rectangular opening 28 to prevent the thumb button 29 from pivoting rearwardly out of the opening 28 in the rear cover 12.

The reel body 20 includes a transverse mounting plate or deck plate 21 and has an integrally molded, radially extending stem 25 with a mounting foot 26 on the outer end thereof for attachment to the appropriate part of a fishing rod (not shown).

A central hub 35 is formed with and projects forwardly of the deck plate 21 and receives in succession a drag plate 210, back spool washer 230, back flat drag washer 233, spool assembly 130, front flat drag washer 235, front spool washer 237, all of which are retained on the hub 35 by means of a spool retainer clip 240 which fits into a groove aligned with a shoulder separating the hub 35 from a reduced diameter and cam supporting front portion 241.

A centershaft 251 is slidably and rotatably mounted in a bore extending through the deck plate 21 and hub 35, with a spinner head assembly 242 threaded onto the forward threaded end of the shaft 251. The spinner head assembly 242 partially surrounds the forward flange 428 of the spool assembly 130 with a supply of fishing line 99 being wound on a spool 131 of the spool assembly 130. A pinion gear 260 is splined on a reduced diameter splined portion 252 of the centershaft 251 and is resiliently maintained in a forward position against the deck plate 21 by a centershaft spring 265 bearing against a stop 255 on the centershaft. The splined connection between the pinion gear 260 and centershaft 251 permits the axial sliding motion of the shaft 251 relative to the pinion gear 260 while at the same time rotation of the pinion gear 260 will rotate the centershaft 251.

Depressing the thumb button 29 moves the centershaft 251 and spinner head assembly 242 forward relative to the hub 35 to retract a pickup pin mechanism 432, mounted on spinner head assembly 242. Manipulating the thumb button in a conventional manner will provide a braking action to the line, will permit casting of the line or will permit retrieving the line onto the spool.

The deck plate 21 has a rearwardly projecting boss 40 with a laterally directed bore 434 for reception, in a concentric manner, of a crankshaft 42, surrounded by a cylindrical sleeve bearing 436. The bearing 436 has an annular groove 438 which, with the bearing properly aligned on the reel body 20 is in planar alignment with a slot defined at the rear of the deck plate 21 within a radially inward extension of the boss. A clip 440 surrounds the sleeve bearing 436 and resides within the groove 438, with forwardly projecting legs 442 of the clip 440 entering the slot in the deck plate 21. This arrangement assures proper positioning of the sleeve bearing 436 and prevents any lateral shifting thereof.

The crankshaft 42, with a main pinion gear 313 attached at one end is rotated in the sleeve bearing 436 in the bore 40 and has a handle 332 attached by means of a nut 333 to the other end of said crankshaft 42. The gear 313 meshes with the pinion gear 260 on the centershaft 251 so that rotation of the crank handle 332 will rotate the centershaft 251 and spinner head assembly 242.

An anti-reverse assembly 330, which is associated with the crankshaft 42, includes a ratchet (not shown in FIG. 1) fixed on the back of the gear 313 for rotation with the gear 313 and crankshaft 42. The anti-reverse assembly 330 includes a pivotable pawl 321, a pawl actuator 324 and a control member 446. The pawl actuator 324 has a pair of bifurcated legs 326 which grip the surface of the crankshaft 42 with sufficient force that the pawl actuator 324 will rotate with the crankshaft 42, but will slide relative to the crankshaft 42 when the gripping force is exceeded. An actuator tab 327 extends transverse to the plane of the pawl actuator 324 and engages in a recess 328 in the pawl 321. The pawl 321 will be situated with the pawl tooth 323 selectively aligned with the ratchet.

Independent, manual control of the pawl 321 is accomplished by the separate control member 446 mounted within a lateral bore 448 in a boss 450 spaced beneath the boss 40. The control member 446 is manipulable externally of the reel body. Clockwise rotation of the control member 446, as viewed in FIG. 1, will pivot the pawl about the pivot tab 322 out of engagement with the ratchet. Thus movement of the crank handle 332 in either a clockwise or counterclockwise direction by the user, with the pawl 321 manually disengaged by the control member 446, will not effect movement of the pawl 321 and thus clockwise and counterclockwise crankshaft rotation will be uninhibited by the pawl 321.

Counterclockwise rotation of the control member 446 will allow the pawl 321 to be moved freely between two limiting positions so that rotation of the crank handle 332 in a counterclockwise direction, as viewed in FIG. 1, will pivot the pawl out of alignment with the teeth of the ratchet, whereupon the crank handle 323 will be permitted to be rotated in that direction without interference. In addition, with the control member 446 in the counterclockwise position, rotation of the handle 332 in the clockwise direction moves the pawl actuator 324 in the clockwise direction with the tab 327 pivoting the pawl 321 in a counterclockwise direction to move the pawl into the path of the ratchet teeth to stop further rotation of the crankshaft 42 and handle 332 in that direction.

Drag actuation is effected by a knurled drag wheel 460 which is captured in and protrudes through a slot 462 beyond the outer surface of the reel body 20. The wheel 460 has a threaded bore and is suspended for rotation by a longitudinally directed bolt 466 extending through the spaced walls flanking the wheel 460.

The drag washer 210 has a substantially flat body 468 and has diametrically opposed tabs 470 bent perpendicularly in a common direction out of the plane of the body 468. The deck plate 21 has locating apertures for receiving each of the tabs 470. The one aperture is in direct alignment with the bolt 466 suspending the drag wheel 460. The forward end 472 of the bolt is slotted and is accessible through the one aperture to receive the one tab 470 of the drag plate 210.

This arrangement of the drag plate 210 prohibits rotation of the bolt 466 as the drag wheel 460 is manipulated. As a result, rotation of the drag wheel effects fore or aft movement of the bolt 460 relative to the reel body 20. Rotation of the wheel in a first direction forces the tab 470 and drag washer forwardly increasing drag braking pressure on the spool 131. Retraction of the bolt 466 and reduction of the braking pressure is accomplished by rotation of the drag wheel 460 oppositely to the first direction.

The reel is provided with a bait clicker 474 seated in boss 482 and is manipulable by the user between engaged and unengaged positions, with silent reel operation occurring with the clicker 474 in the latter position. The bait clicker 474 consists of a body portion 476 having a bifurcated end with long and short legs, respectively 478,480.

Leg 478 is of a flexible construction and extends into engagement with the pinion gear 260. The end 488 of the clicker 474 rides over the teeth on the pinion gear 260 as the centershaft 251 is rotated and produces a clicking sound that is audible through the reel housing. The leg 478 will deform upon reverse rotation of the centershaft 251 (line retrieval) and will align to provide a softer clicking sound as occurs during forward rotation of the centershaft.

DESCRIPTION OF PREFERRED EMBODIMENT

Figure 3:
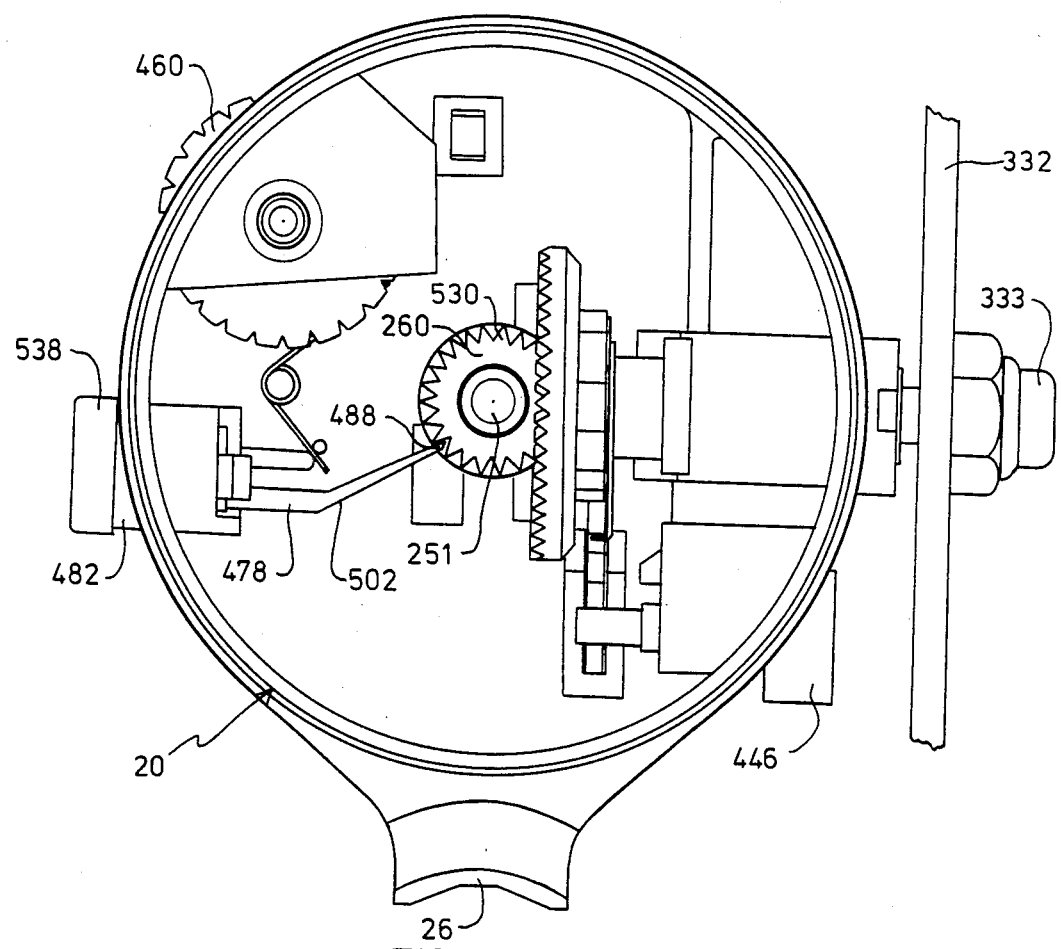
FIG. 3 is an enlarged rear elevation view of the reel in FIG. 2 with the rear cover removed and showing a preferred form of the bait clicker in the engaged position.
Figure 4:
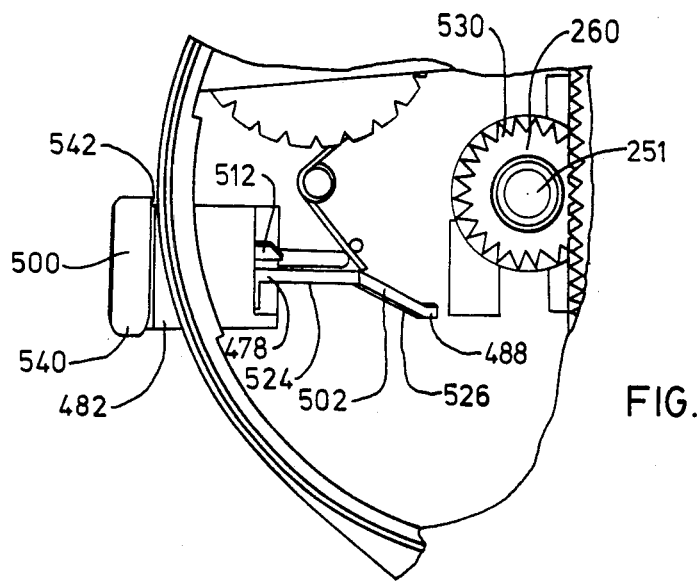
FIG. 4 is an enlarged fragmentary rear elevation view of a preferred form of the bait clicker of FIG. 3 with the bait clicker in a disengaged position.
Figure 5:
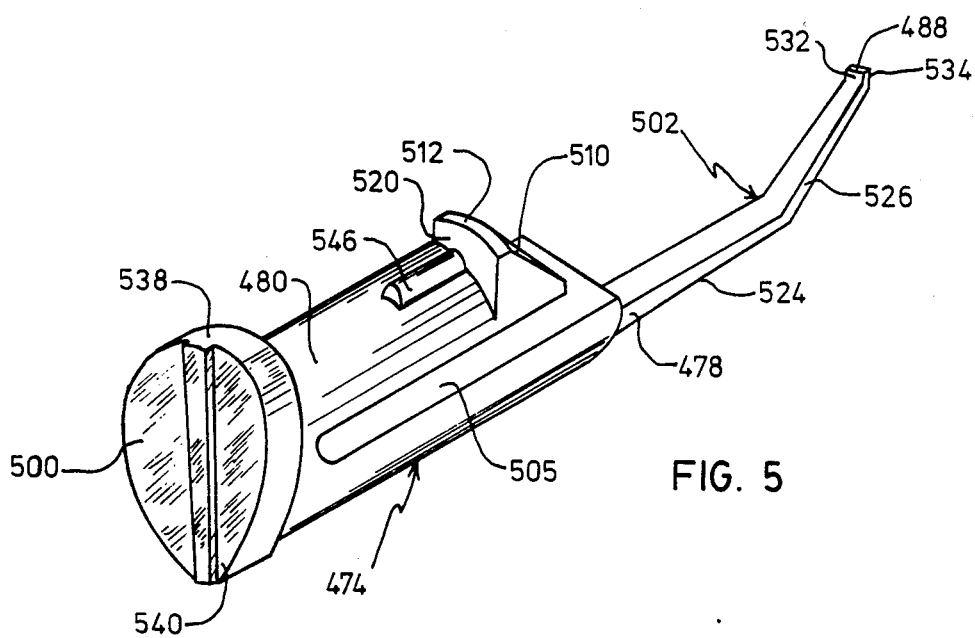
FIG. 5 is an enlarged perspective view of the bait clicker.

The details of a preferred form of the bait clicker 474 are illustrated in FIGS. 2-10. The bait clicker, which is formed preferably of plastic or other light, deformable material, comprises as is best shown in FIGS. 5,6,7 an externally actuable control knob 500 integrally formed with a bifurcated body 476 defining spaced long and short legs 478,480. The longer leg 478 terminates in an end 488 of an elongate, resilient finger 502 arranged to selectively coact with the pinion gear 260, associated with the centershaft 251, to produce an audible clicking noise upon rotation of the centershaft.

As most clearly seen in FIGS. 3, 4 and 8-10, the reel body 20 has an integrally formed boss 482 with a lateral passageway for the clicker 474 afforded by a circular bore 483. The axis of the bore 483 is disposed slightly beneath and transverse to the rotational axis of the centershaft 251. The diameter of the bore 483 is substantially equal to the diameter of the space occupied cooperatively by the legs 478,480 of the body 476 in their undeformed state, depicted in FIGS. 5, 6 and 10.

Figure 8:
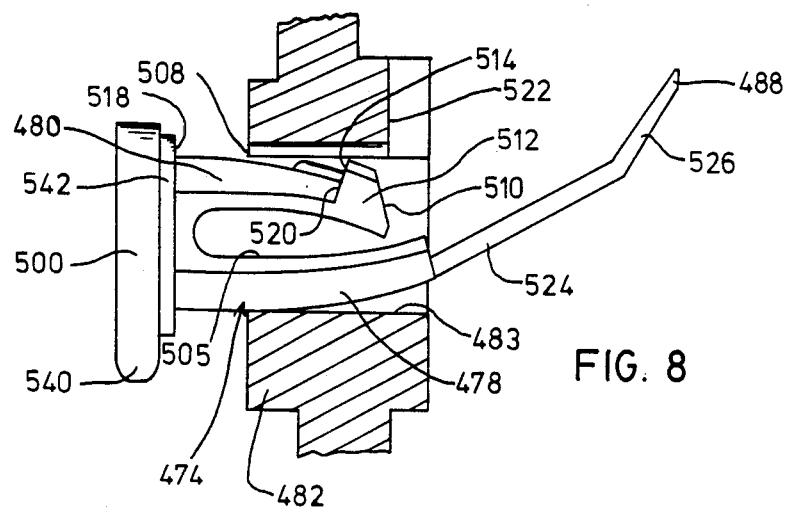
FIG. 8 is a side elevation view of the bait clicker during the initial stages of assembly.
Figure 9:
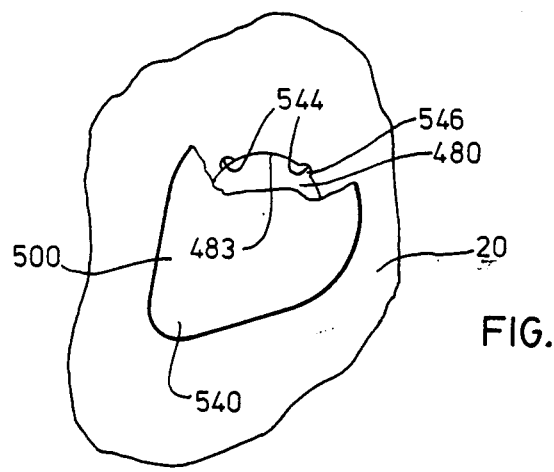
FIG. 9 is a fragmentary view of the assembled bait clicker from the end opposite that shown in FIG. 7 and revealing locking detents on the reel housing.

Between the legs 478,480 is a slot 505 that permits deformation of the legs, each toward the other, during assembly of the clicker 474 with the reel body 20. The clicker 474 is shown in the initial stages of assembly in FIG. 8. The finger 502 on leg 478 is initially introduced to the bore 483. As the short leg 480 reaches the entry to the bore, the circumferential edge 508 about the bore 483 first encounters a tapered ramp 510 formed integrally with a lip 512 at the free end of the short leg 480. The ramp progressively deforms the leg 480 radially inwardly of the bore 483 and simultaneously causes deflection of the longer leg 478 as seen in FIG. 8. With the legs 478,480 squeezed within the bore 483 the short leg is guided through the bore by the trailing edge 514 of the lip 512.

Figure 10:
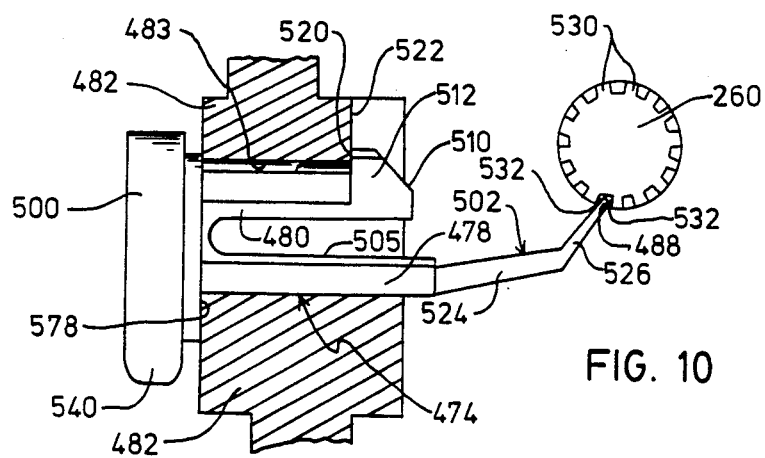
FIG. 10 is a fragmentary, sectional rear view of the reel with the bait clicker assembled and in engaged position with the pinion gear.

In the fully seated position, depicted in FIG. 10, the wall or boss 482 of the reel housing is captured closely between an inwardly facing wall 518 of the knob 500 of the clicker 474 and a shoulder 520 defined by the lip 512. Due to the restoring forces in the legs 478,480, the body of the clicker 474 tends to recapture its original shape, urging the longer leg 478 flushly against the walls within the bore 483 and seating the lip 512 behind the inwardly facing wall 522 of the boss 482. The clicker 474 can be rotated within the bore 483, however it is confined against shifting axially relative to the bore 483 by the above described arrangement. Assembly of the clicker 474 thus involves merely aligning the clicker axially with the bore 483 and pressing with a force sufficient to deflect the legs until the fully seated position is attained.

The clicker finger 502 is formed integrally with the longer leg 478 and has a first portion 524 substantially aligned with the longitudinal extent of the leg 478 as can be seen more clearly in FIG. 6. The first portion 524 originates from an off-center position on the long leg 478, for reasons elaborated below. A second portion 526 is angularly disposed relative to the first portion 524 with the free end 488 of the finger 502 coplanar in one direction with the second portion and offset away from the second portion 526 in a second plane transverse to the first plane. The first and second portions 524,526, respectively, and the free end 488 are shown to be substantially rectangular in cross-section transverse to the longitudinal extent of the finger 502. The narrower dimension of the finger 502 is disposed somewhat in a vertical direction with the clicker assembled and engaged as in FIG. 3.

The free end 488 of the clicker 474 is arranged to interact with the teeth 530 on the pinion gear 260. The angle between the first and second finger portions 524,526 is chosen so that the longitudinal extent of the second portion 526 and free end 488, with the clicker 474 in the engaged position, is substantially in radial alignment from the rotational axis of the centershaft 251. The clicker thus presents either a flat face 532 or a flat face 534 (FIG. 7) for coaction with the pinion gear teeth 530 in either direction of rotation of the centershaft.

Because the end 488 of finger 502 has a reduced cross-sectional area in the engaged position of FIG. 3, substantial flexing of the finger occurs as the free end 488 traverses the periphery of the pinion gear 260. At the same time the larger dimension of the finger 502 rigidifies the finger to resist deformation as the finger is caused to be intermeshed with the teeth of the pinion gear. As the pinion gear is rotated in either direction, the free end 488 will initially make substantially face-to-face contact with one of the teeth 530. Further rotation of the pinion gear flexes the finger until the engaged tooth clears the free end 488 of the finger 502. The restoring force in the finger 502 propels the free end of the finger against the adjacent following tooth to produce the clicking sound.

It can be seen that the location of the first portion 524 of the finger 502 in relationship to the long leg 478 is such that the forces applied to the finger 502 by the teeth of the pinion gear are directed along a line radially inwardly of the outer peripheral surface of the long leg 478. Thus there is less tendency of the clicker 474 to rotate from forces imparted by the pinion gear 260.

The angular orientation of the second portion 526 relative the rotational axis of the clicker body 476 causes the free end 488 to trace a circular path of substantial diameter between the engaged position of FIG. 3 to the disengaged position of FIG. 4. Thus only a minor adjustment of the control knob 500 need be effected to move the finger between engaged and disengaged positions with the pinion gear.

To facilitate control of the clicker 474, the control knob is configured with a rounded portion 538 which tapers to a rounded nose 540. The tapered portion of the knob 500 extends radially beyond the boss 482 and is readily manipulable as seen clearly in FIG. 4. Further, one might glance at the orientation of the control knob 500 to see if the clicker 474 is engaged without having to operate the reel. The knob is stepped to provide a reduced diameter portion 542 which directly contacts the boss 482 with the clicker 474 in the assembled position. This permits an expanded construction for the control knob 500, yet reduces the frictional forces between the reel body 20 and the clicker 474 at the external portion of the reel.

To positively locate the clicker 474 selectively in either the engaged or disengaged positions, a pair of detents 544 are provided extending laterally relative to the reel body 20 and spaced circumferentially about the bore 483. The short leg 480 has a rib 546 of a corresponding rounded cross-sectional configuration which is engageable closely within the detents. This arrangement locks the clicker 474 in either of two positions wherein the detents 544 and rib 546 coincide. When sufficient rotative force is applied to the locked control knob 500, the rounded rib will traverse the curved detent and deform the short leg 480 towards the long leg 478, permitting resetting of the clicker 474. With the rib and detent 544 coinciding, the restoring force on the flexed leg 480 will seat the rib in a locked position with the selected detent 544. The detents are arranged to coincide with the rib when the clicker is either in the fully engaged or in the fully disengaged positions.

It is contemplated that the clicker 474 may be located on any reel housing so as to engage the finger with a rotatable gear or rotatable spool of a fishing reel so as to produce an audible clicking sound when the rotatable gear or rotatable spool is rotating.

It should be understood, of course, that the specific forms of the invention illustrated and described herein are intended to be representative only, as certain changes and modifications may be made without departing from the scope of the teachings herein disclosed. Accordingly, reference should be made to the appended claims in ascertaining the full scope of the invention.

I claim:

1. In a fishing reel of the type having a housing, a rotatable shaft carried by the housing, a toothed member associated with the shaft for rotation in response to movement of the rotatable shaft, and a bait clicker mounted in a bore in the housing which, in contact with the toothed member, provides an audible clicking sound upon rotation of the toothed member, the bait clicker comprising:
   a control knob situable externally of the reel housing;
   a body portion integrally formed with the control knob;
   means for mounting the body portion for rotation within the bore; and
   a resilient finger integrally formed with the body portion and selectively directly engageable with and disengagable from the toothed member upon rotating the body portion in the bore, said finger reacting with the toothed member to produce a clicking sound to alert a user to rotation of the toothed member.

2. The fishing reel as claimed in claim 1 wherein the body portion of the control knob is bifurcated so as to define spaced resilient legs which fit closely within the bore in the housing, one of the legs having a lip thereon, the lip causing the one leg to deform as the legs are introduced to the bore, the lip and control knob cooperatively capturing a wall of the housing with the bait clicker is a fully seated position and said finger extends generally axially with respect to the bore in the housing.

3. The fishing reel as claimed in claim 2 wherein a free end of the finger engages the toothed member, the finger extending from another of the legs of the body portion with a portion of the finger being angularly disposed with respect to the axis of the bore with the bait clicker in the fully seated position such that rotation of the bait clicker will cause the free end of the finger to trace a circular path, the bait clicker being selectively rotatable between a first position in which the free end engages the toothed member and a second position in which the free end is rotated out of engagement with the toothed member for silent reel operation.

4. The fishing reel as claimed in claim 1 wherein means are provided for selectively holding the finger either in a first position in engagement with the toothed member or in a second position away from engagement with the toothed member.

5. The fishing reel as claimed in claim 1 wherein the bait clicker is a one piece plastic molded member and the means for mounting the body portion comprise snap-fit means such that assembly of the bait clicker involves merely directing the finger through the bore and press fitting the body in the bore.

6. In a spinning style fishing reel having a housing, a rotatable axially extending centershaft carried by the housing, a toothed pinion gear mounted for rotation with the centershaft, a laterally extending crankshaft having a gear meshing with the pinion gear, and a crank handle for imparting rotational movement to the crankshaft and to the centershaft, the housing having a circular bore with a longitudinal axis substantially parallel to the axis of the crankshaft, in combination:
   a one-piece bait clicker for providing an audible clicking sound upon rotation of the gears comprising:
   a control knob actuable externally of the reel housing;
   a body portion integrally formed with the control knob;
   means for mounting the body portion for rotation within the circular bore; and
   a resilient finger integrally formed with the body portion and directly engageable with the teeth on one of the gears, the finger reacting with the teeth on the one gear to produce the clicking sound to alert the user to rotation of the gears and movable away from the teeth by rotating the body within the circular bore.

7. The fishing reel as claimed in claim 6 wherein the gear being contacted by said finger is the pinion gear on the centershaft.

8. The fishing reel as claimed in claim 7 wherein the body portion is bifurcated so as to define spaced, resilient legs which fit closely within the bore, one of the legs having a lip thereon, said lip causing said one leg to deform as the legs are introduced to the bore, said lip and control knob cooperatively capturing a wall of the housing with the bait clicker in a fully seated position.

9. The fishing reel as claimed in claim 8 wherein the legs are elongate and are in substantially parallel relationship each to the other, and the finger extends from another of the legs, the finger having a free end engaging the pinion gear and a portion extending angularly relative to the longitudinal extent of the legs.

10. The fishing reel as claimed in claim 9 wherein the angularly extending portion is substantially perpendicular with respect to the rotational axis of the centershaft such that the clicking sound is generated no matter which direction the centershaft is rotated.

11. The fishing reel as claimed in claim 7 wherein said means mount the finger for movement either to a first position in engagement with the pinion gear or a second position away from engagement with the teeth of the pinion gear such that silent reel operation can occur, the body portion having a protruding rib and the housing having detents cooperating with the rib with the bait clicker in either the first or second position so that the bait clicker can be positively located in either the first or second position and further so that inadvertent adjustment of the bait clicker is prevented.

12. The fishing reel as claimed in claim 11 wherein the cross-sectional area of the finger transverse to its length is substantially rectangular, with the smaller dimension of the rectangular area being substantially transverse to the rotational axis of the centershaft with the bait clicker in the first position.

13. The fishing reel as claimed in claim 6 wherein the bait clicker is a molded plastic member.

* * * * *